United States Patent
Ishikawa

(10) Patent No.: US 6,832,439 B2
(45) Date of Patent: Dec. 21, 2004

(54) SCRIBING DEVICE

(75) Inventor: Hirokazu Ishikawa, Tokyo-to (JP)

(73) Assignees: THK Co., Ltd., Tokyo-to (JP); Beldex Corporation, Tokyo-to (JP)

(*) Notice: Subject to any disclaimer, the term of this patent is extended or adjusted under 35 U.S.C. 154(b) by 0 days.

(21) Appl. No.: 10/284,106

(22) Filed: Oct. 31, 2002

(65) Prior Publication Data

US 2003/0084578 A1 May 8, 2003

(30) Foreign Application Priority Data

Nov. 2, 2001 (JP) .................................... P2001-338137

(51) Int. Cl.[7] .............................................. B43L 13/00
(52) U.S. Cl. ...................................................... 33/18.1
(58) Field of Search ........................... 33/18.1, DIG. 1, 33/DIG. 2; 83/881; 225/96

(56) References Cited

U.S. PATENT DOCUMENTS 4,220,066 A * 9/1980 Hargreaves et al. .......... 83/886
6,460,257 B1 * 10/2002 Shimotoyodome .......... 33/18.1
6,536,121 B1 * 3/2003 Ishikawa et al. ............. 33/18.1

FOREIGN PATENT DOCUMENTS

JP  2001-48562   2/2001
JP  2001-179732  7/2001

* cited by examiner

Primary Examiner—Christopher W. Fulton
(74) Attorney, Agent, or Firm—Westerman, Hattori, Daniels & Adrian, LLP

(57) ABSTRACT

A scribing device for forming a scribe line on a work comprises a vibration generator for generating vibration, a cutter for cutting a work by utilizing vibration thereof, a shaft extending vertically from the vibration generator so as to transmit the vibration of the vibration generator to the cutter, a guide unit for guiding a linear motion of the shaft in a central axis direction thereof, and a load adjusting mechanism for adjusting a load applied to the work from the cutter, the load adjusting mechanism being operated by magnetic force. According to such scribing device, the guide unit guides a vertical moving (rising) motion of the shaft by the load adjusting mechanism and guides the vibration of the shaft caused by the vibration generated by the vibration generator.

16 Claims, 6 Drawing Sheets

SCRIBING DEVICE

FIELD OF THE INVENTION

The present invention relates to a scribing device or scriber for forming (scribing) a scribe line on a work formed of a brittle material such as glass, semiconductor or like.

RELATED ART

There is known a scribing device for forming a scribe line on a surface of a work or work piece. In this working, when a cutter which is now vibrating is pressed against the work surface, vertical crack will be generated on the work surface so as to extend in thickness direction thereof and, in this state, when the cutter is moved on the work surface, a continuous scribe line (cracks) will be caused on the work surface. After the formation of such scribe (scribed) line, by bending the work along the scribe line, the work is broken.

FIG. 7 shows a scribing device having a conventional structure and provided with a scribing body 2 for vibrating a cutter 1. The scribing body 2 has a housing in which a piezoelectric element as vibration generation member is accomodated. A shaft 4 is disposed so as to extend downward, as viewed, from a lower portion of the housing and adopted to be vertically guided by a guide member disposed inside the housing 3. The cutter 1 mentioned above is mounted to the lower end portion of the shaft 4. As such cutter 1, there may be utilized a square-pyramid shaped diamond tool. When the piezoelectric element is vibrated, the shaft 4 is then vibrated together with the cutter 1.

The housing 3 is attached to a slide block 5, which is mounted to a table 6 through a guide member 7 such as linear guide. The guide member 7 operates to guide the slide block 5, the housing 3 and the scribing body 2 with the shaft 4 and the cutter 1 in a linearly movable manner with respect to the table 6. The table 6 is moved by a moving, i.e. driving, mechanism 10 with respect to a work (work piece) 9.

A pair of magnets 8a and 8b mounted to the sides of the scribing body 2 and the table 6 repulse from each other so as to adjust stationary load applied by the cutter 1 to the work 9. When the cutter 1 is raised by the repulsive force of the magnets 8a and 8b, static load (that is, a load which is applied from the cutter to the work at the time of no vibration of the vibration generating member) can be adjusted. In this time, the vertical motion (rising or floating motion) of the scribing body 2 is guided by the guide member 7.

According to the scribe device of the structure mentioned above, the cutter 1 can be vibrated, and the static load applied to the work 9 from the cutter 1 can be suitably adjusted in accordance with kinds, types or thickness of the work to be broken.

In the conventional scribing device of the characters and structures mentioned above, however, the guide member 7 for guiding the rising motion of the scribing body 2 and the guide member for guiding the vibration of the shaft 4 are disposed independently at the positions apart from each other by distance L in FIG. 7 in the lateral direction. Therefore, when the shaft 4 is vibrated, a moment load is generated to the guide member 7 which cantilevers the scribing body 2.

If such moment load is generated, the cutter 1 is vibrated in the horizontal direction, as well as in the vertical direction as viewed in FIG. 7. When the cutter 1 is horizontally vibrated, a horizontal component force will be generated to the load applied to the work 9 from the cutter 1, and according to such component force, horizontal crack may be generated to the surface of the work 9, thus deteriorating the work 9, and hence, being inconvenient.

In addition, when the vibration generating member is vibrated, the scribing body 2 as well as the cutter 1 is vibrated. However, the follow-up performance of the guide member 7 will be made worse due to the moment load applied to the guide member 7, and accordingly, resistance will be caused at the time of the vibration of the scribing body 2.

Furthermore, the separate, i.e. independent, location of the guide member 7 for guiding the rising motion and the guide member for the vibration makes complicated the structure of the scribing body and increases its weight. In a case where the work 9 has a worse degree of flatness or where the cutter is moved so as to intersect the once scribed line, the scribing body 2 is vertically raised up and down, so that when the entire weight of the scribing body is increased, the inertia force of the scribing body is also increased, thus causing large variation of the load applied to the work 9 from the cutter 1.

SUMMARY OF THE INVENTION

An object of the present invention is therefore to substantially eliminate defects or inconveniences encountered in the prior art described above and to provide a scribing device capable of substantially suppressing horizontal vibration of a cutter in the scribing device and vibrating the cutter only in the vertical direction with simple structure of a vibrating portion having reduced weight.

This and other objects can be achieved according to the present invention by providing, in one aspect, a scribing device for forming a scribe line on a work comprising:

a vibration generator for generating vibration;

a cutter for cutting a work by utilizing vibration of the vibration generator;

a shaft extending vertically downward from the vibration generator so as to transmit the vibration of the vibration generator to the cutter;

a guide unit for guiding a linear motion of the shaft to the cutter in a central axis direction thereof; and a load adjusting mechanism for adjusting a load to be applied to the work from the cutter, the load adjusting mechanism being operated by means of magnetic force, wherein the guide unit guides a moving motion of the shaft by the load adjusting mechanism and guides the vibration of the shaft caused by the vibration generated by the vibration generator.

According to this aspect of the present invention, the guide unit attains commonly the function of guiding the vibration of the shaft caused by the operation of the vibration generator and the function of guiding the upward moving (rising or floating) motion of the shaft by means of load adjusting mechanism. Accordingly, since it is not necessary to independently (separately) disposed two guide members for achieving the above two functions, respectively, as made in the prior art, any moment load is not caused. Thus, the horizontal vibration of the cutter can be prevented from causing and the cutter can be vibrated smoothly only in the vertical direction.

In addition, since the single guide unit acts to attain both the guiding functions mentioned above, the structure of the guide unit can be made simple and light in weight, thus making small the variation of the load applied to the cutter.

For such guide unit, there may be preferably utilized, for example, a linear guide, a ball spline guide, a ball bush guide or a slide bearing guide.

In this aspect, the following preferred examples may be adopted.

The scribing device may further comprises a cutter moving mechanism for moving the cutter along the work.

The shaft is formed, at an outer peripheral surface thereof, with a rolling member rolling portion, the guide unit comprises an outer sleeve fitted to the shaft, the sleeve being formed, on an inner peripheral surface thereof, with a rolling member rolling portion, and a number of rolling members interposed between the rolling member rolling portion formed on the shaft and the rolling member rolling portion formed on the outer sleeve. The rolling members may be balls and the rolling member rolling portion formed on the shaft and the rolling member rolling portion formed on the outer sleeve may be grooves.

The vibration generator has a center line and the shaft has a center line which substantially accords with the center line of the vibration generator.

The vibration generator is accommodated in a housing and a coned disc spring is disposed in the housing at a portion between the shaft and the vibration generator so as to follow up the vibration of the shaft with that of the vibration generator.

A table may be further provided for the scribing device, which is movable with respect to the work, the guide unit is mounted to the table which is moved by the moving mechanism.

The load adjusting mechanism may comprise a pair of magnets disposed apart from each other in the shaft vibrating direction, a piezoelectric element, or a super-magnetostrictive element.

According to these preferred examples, a scribe line can be well described by moving the cutter along and on the surface of the work.

Since the shaft is fitted into the outer sleeve so as to surround the outer periphery of the shaft, the shaft can be smoothly and stably guided in a vertical direction when the shaft is vibrated. Moreover, since the rolling members are interposed between the shaft and the outer sleeve, resistance, which is caused at a time of the vibration of the shaft, is possibly reduced.

In addition, the vibration of the vibration generator can be transferred to the shaft with high efficiency in the central axis direction thereof without imparting adverse moment load to the shaft.

The location of the coned disc spring will make easy to transfer only the vertical (axial) vibration.

In a further aspect of the present invention, there is also provided a scribing device for forming a scribe line on a work comprising:

- a table disposed to be movable with respect to the work;
- a moving mechanism for moving the table;
- a vibration generator for generating vibration;
- a cutter for cutting the work by utilizing vibration of the vibration generator;
- a shaft extending vertically downward from the vibration generator so as to transmit the vibration of the vibration generator to the cutter;
- a guide unit, mounted to the table, for guiding a linear motion of the shaft in a central axis direction thereof; and
- a load adjusting mechanism for adjusting a load to be applied to the work from the cutter, the load adjusting mechanism comprising a magnet. The magnet includes a pair of magnet pieces disposed apart from each other in the shaft vibrating direction.

According to this aspect, substantially the same advantageous effects and functions as those mentioned with reference to the first aspect will be achieved.

The nature and further characteristic features of the present invention will be made more clear from the following description with reference to the accompanying drawings.

DESCRIPTION OF THE PREFERRED EMBODIMENT

Figure 1:
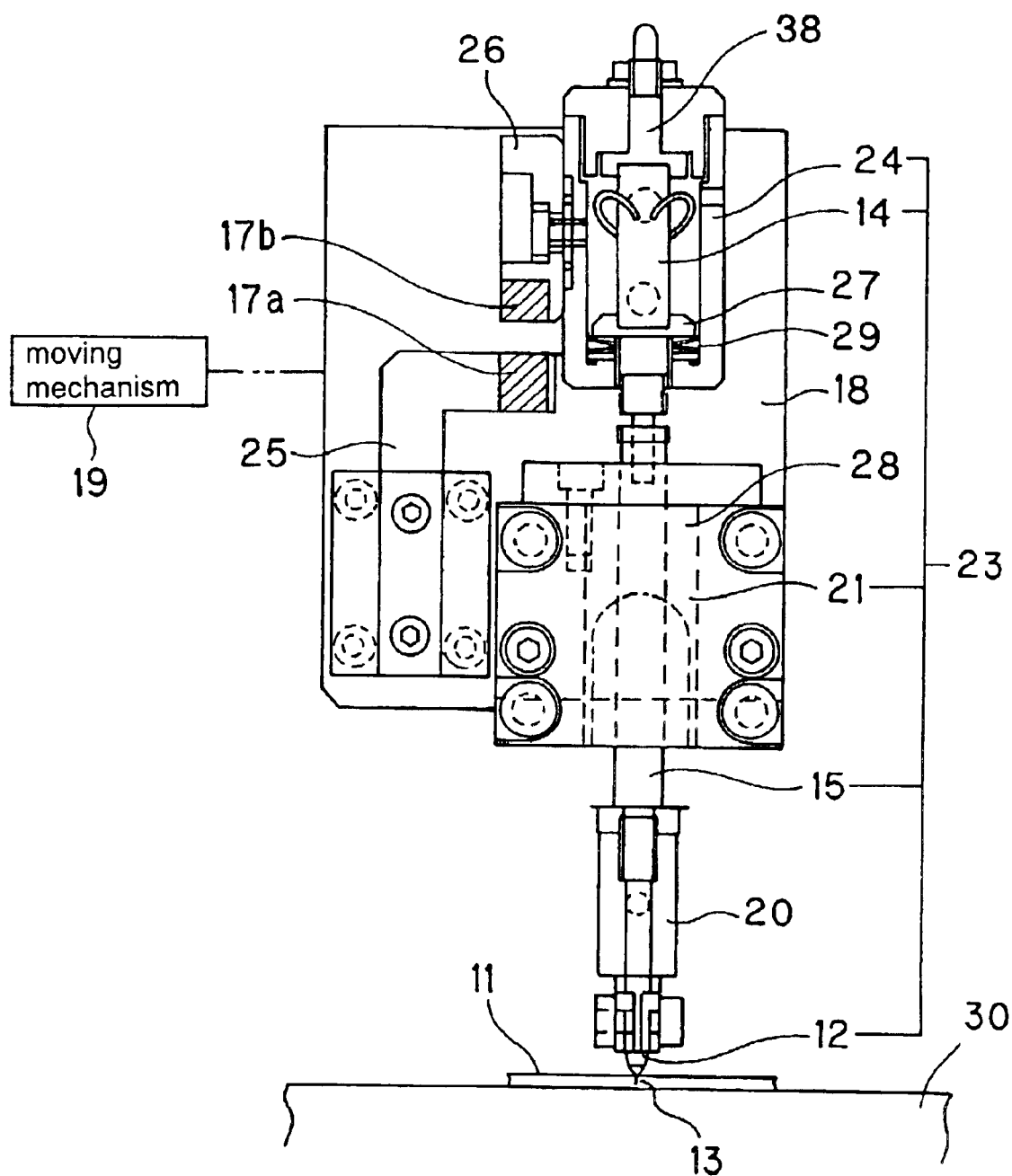
FIG. 1 is an illustration showing a front view of a scribing device according to a first embodiment of the present invention.
Figure 2:
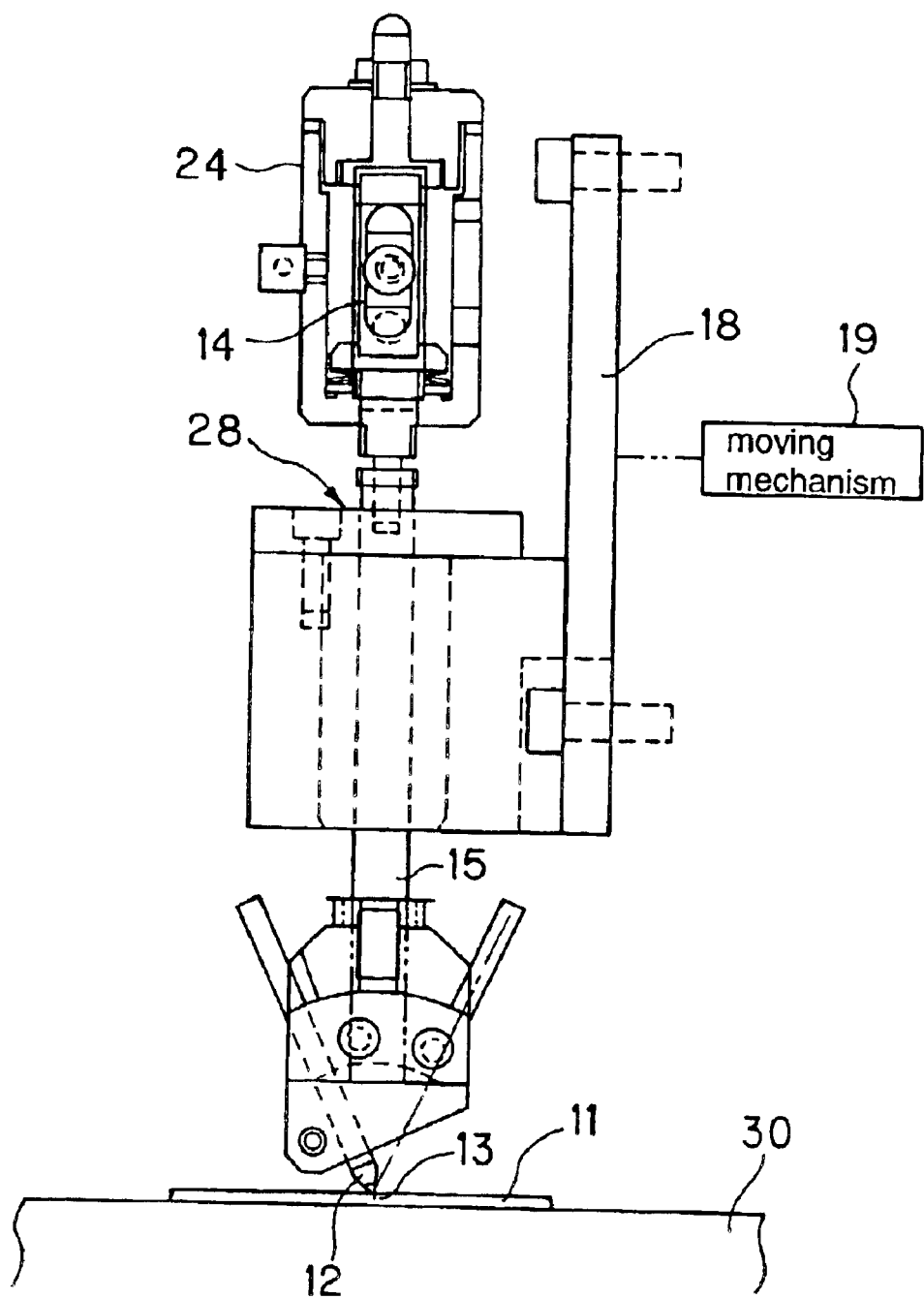
FIG. 2 is a side view of the scribing device of FIG. 1.

First, a scribing device shown in FIGS. 1 and 2 represents the first embodiment of the present invention and is for scribing a scribe line on a surface of a work (or work piece) 11, in shape of thin plate, made from brittle material such as glass, semiconductor, ceramics or like so as to extend in the thickness direction thereof. This scribing device comprises a vibration generator 14, a shaft 15 extending vertically from the vibration generator 14, a cutter 12 attached to a lower end portion of the shaft 15 so as to be vibrated by the vibration generator 14 through the shaft 15, a guide member 28 for guiding the linear motion of the shaft in its central axis direction and a pair of magnets 17a and 17b as a load adjusting means utilizing magnetic force. The guide member 28 is mounted to a table 18 which is movable by a moving or driving mechanism 19, which acts to move the table 18 so as to move the cutter 12 along the work 11 in two-dimensional (X-Y) direction or three-dimensional (X-Y-Z) direction.

In an assembled state, when the scribing device is driven, the distal (front end) of the cutter 1 abuts against the surface of the work 9 as shown in FIG. 1, and under the state, when the vibration generator 14 is driven to vibrate the cutter 12, vertical cracks are generated to the surface of the work 11, and when the cutter 12 is then moved on the surface of the work 11, these cracks are connected to form one continuous crack, thus forming a scribe (scribed) line 13.

As the cutter 12, a square-pyramid shaped diamond tool will be utilized. Although such square-pyramid shaped diamond tool is effectively utilized for a work having a thin thickness, in a case where the work has a large thickness such as glass, a wheel tool having an abacus-counter-shape.

A piezoelectric element such as piezoelectric actuator, which causes a distortion, for example, upon application of external electric field, is utilized for the vibration generator 14. In the use of the piezoelectric element 14, it is periodically expanded and contracted by changing voltage to be applied with a predetermined frequency. A stress is generated to the piezoelectric element by applying the external field, and this stress is transmitted to the cutter 12. When the stress is applied to the cutter 12, a recess in form of square-pyramid and a vertical crack are both formed to the surface of the work 11.

The shaft 15 for transmitting the vibration generated by the vibration generator 14 to the cutter 12 has a circular shape in cross section and is supported by the guide member 28 to be linearly movable along the central axis direction thereof. The shaft 15 is provided, at its lower end portion, a tool holding portion 20 (tool holder), and on the other hand, the upper end portion thereof is connected to the vibration generator 14.

Figure 3:
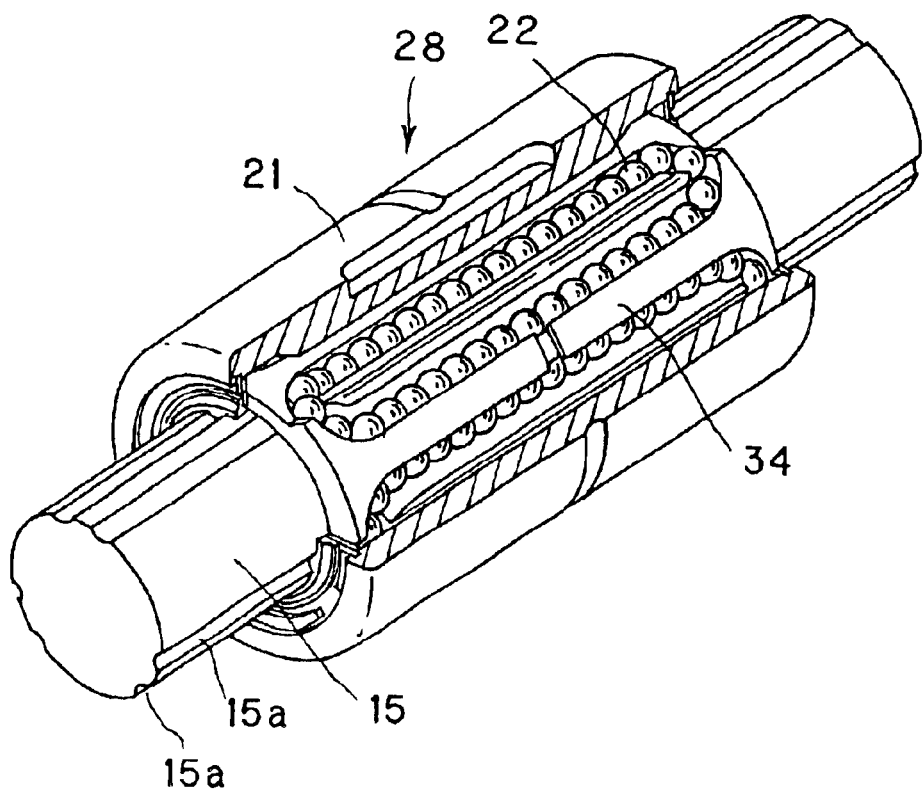
FIG. 3 is a perspective view of a guide member of the scribing device of FIG. 1.
Figure 4:
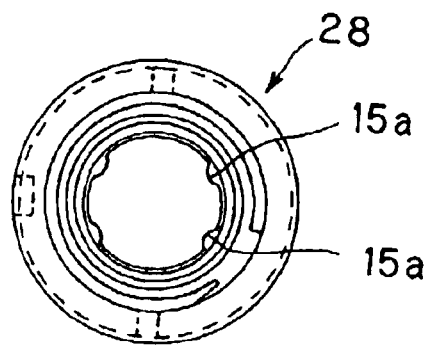
FIG. 4 is a front view, partially in section, of the guide member of FIG. 3.

As shown in FIGS. 3 and 4, a plurality of rolling member rolling path rows 15a, in form of ball rolling grooves, are formed on the outer periphery of the shaft 15 so as to extend in the axial direction. Further, a shaft member having polygonal cross section may be utilized other than that having a circular cross section. Moreover, a shaft having a cross section different in its axial direction may be also used. In addition, a solid shaft as well as hollow shaft may be used as the shaft 15 of the scribing device of this invention.

The center line of the vibration generator 14 and the center line of the shaft 15 are substantially aligned with each other so as to effectively transfer the vibration of the shaft in the axial direction thereof. On the contrary, if these center lines are shifted from each other, moment load will be applied to the shaft 15.

The guide member 28 for guiding the linear motion of the shaft 15 in the axial direction thereof comprises an outer cylinder or sleeve 21 covering the outer periphery of the shaft 15 and a number of balls 22, 22, - - - as rolling members arranged between the outer sleeve 21 and the shaft 15. Such guide member 28 is mounted to the table 18 through a bracket. This guide member 28 attains function of guiding the motion, for example, raising motion, of the shaft 15 and function of guiding the vibration of the shaft 15 generated by the vibration generator 14.

Figure 5:
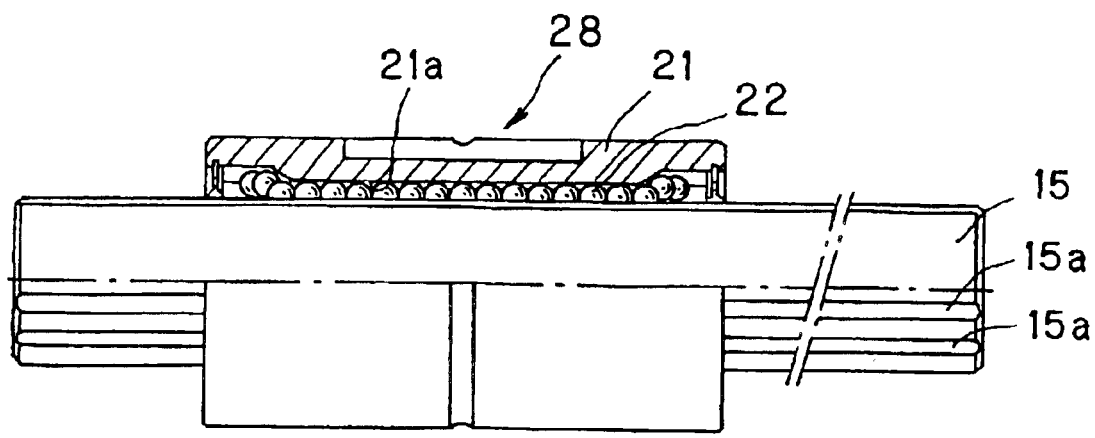
FIG. 5 is a side view, partially in section, of the guide member of FIG. 3.

FIGS. 3 to 5 represents one example of the guide member 28. With reference to these figures, the shaft 15 is formed as a spline shaft formed with a plurality of rows of ball rolling grooves 15a extending in the axial direction thereof. On the other hand, the outer sleeve 21 fitted to the shaft 15 is formed, at an inner peripheral surface thereof, with a plurality of ball rolling grooves 21a as rolling member rolling paths extending in the axial direction so as to correspond to the ball rolling grooves 15a of the shaft 15. A number of balls 22, 22, - - - are interposed between these ball rolling grooves 15a and 22a and roll therebetween. Inside the outer sleeve 21, there is formed an endless circulation path for circulating the balls 22, 22 - - - therealong and a retainer 34 for retaining the balls 22 is also assembled therein. The balls 22 roll and move between the outer sleeve 21 and the shaft 15 in accordance with the linear motion of the shaft 15 with respect to the outer sleeve 21. The balls 22 circulate along the endless circulation path while rolling therealong. Further, in consideration of the shaft 15 having a small amplitude, a limited circulation path may be adopted without forming the endless circulation path. Furthermore, the guide member 28 of the structure mentioned above may be substituted with other various types of members capable of guiding the reciprocal motion of the shaft 15, such as linear guide, ball bush guide, or slide bearing guide.

With reference to FIG. 1, the magnets 17a and 17b giving rising or floating force to the cutter 12 by utilizing the magnetic force are composed of a pair of permanent magnets separated from each other in the vibrating direction of the shaft 15. One 17a of these magnets is attached to the side of the table 18, and the other one 17b thereof is attached to the side of a scribing body 23 of the scribing device (i.e. in this embodiment, an accommodation case, i.e., housing 24, in which the vibration generator 14 is accommodated). A bracket 25 is fixed to the table 18 and the magnet 17a, and another bracket 26 is fixed to the housing 24. The magnet 17b is mounted to this bracket 26. In the illustrated embodiment, although the magnet 17b is fixed to the housing 24, the magnet 17b may be mounted to any portion on the side of the vibrating scribing body 23, for example, shaft 15. The magnets 17a and 17b are arranged so that the same poles, for example, N-poles, are opposed to each other, and the static load applied to the work 11 from the cutter 12 by the repulsive force caused between these magnets 17a and 17b can be reduced.

In a modified embodiment, the magnet 17a may be replaced with a position adjusting mechanism, not shown, such as micro-meter for adjusting its height to thereby vary the static load applied to the work 11 from the cutter 12. Furthermore, the permanent magnets 17a and 17b may be also substituted with electromagnets which are capable of adjusting the magnetic force. Further, the magnets 17a and 17b may be formed so as to each provide a ring shape having a center positioned on the central line of the shaft.

The vibration generator 14 is accommodated in the housing 24. The vibration generator 14 has its lower end portion abutting against a holder 27 attached to the upper end portion of the shaft 15 and has its upper end portion abutting against an adjusting screw 28 disposed to the upper portion of the housing 24. A spring 29 is arranged to the lower portion of the housing 24 so that the vibration of the shaft 15 follows up the vibration of the vibration generator 14. This spring has a coned disc shape having a constant peripheral cross section and acts to urge upward the holder 27 by its elastic force and impart a preload (i.e., a force compressing the vibration generator 14 in the axial direction thereof) to the vibration generator 14 between the holder 27 and an adjusting screw 38 mounted to the housing 24. In order to prevent the cutter 12 from rising from the work 11 at the vibrating time of the vibration generator 14, a weight may be provided for the housing 24 or spring or magnet may be disposed so as to urge downward the housing 24.

It may be said that the scribing device of this embodiment resembles a model in which there exist a weight having a mass of M1 (mass of shaft 15 and that of cutter 12) and a weight having a mass of M2 (mass of housing 24 and a mass of floating motion preventing weight) with the vibration generator 14 being positioned therebetween. For this reason, in order to effectively transfer the stress, caused by the vibration generator 14, to the cutter 12, it is important to optimally set the balance of the weights having the mass of M1 and M2 disposed on both sides of the vibration generator 14. In general, by making large the mass M2 more than the mass M1, the stress caused to the vibration generator 14 can be effectively transferred to the cutter 12.

The scribing device of the structures and characters mentioned above will be used and utilized in the following manner.

At first, the work 11 is set and positioned on a base 30 horizontally arranged. Then, the table 18 is moved by means of moving mechanism 19 horizontally with respect to the work 11 on the base 30. After the cutter 12 mounted to the scribing body abuts against the edge of the work 11, the cutter 12 then runs on the upper surface thereof, and when the cutter 12 runs on the work 11, a static load is applied to the work 11 from the cutter 12. In this moment, by adjusting the height of the magnet, a static load of the amount corresponding to the repulsive force due to the magnet is reduced and the static load can be hence adjusted. In a case of excessively increased static load, horizontal crack may be formed to the surface of the work 11, and on the contrary, in a case of excessively decreased static load, when the scribing body 23 is vibrated, the cutter 12 is floated from the surface of the work 11, which will be hence damaged. The magnitude of the static load will be set in accordance with the material of the work 11 and the thickness thereof.

After the predetermined or desired static load has been obtained, high frequency field is applied to the vibration generator 14 to thereby periodically vibrate the same. The vibration of the vibration generator 14 is transmitted to the cutter 12 by way of the shaft 15, and when the cutter 12 is vibrated, a recess is formed to the upper surface of the work and a vertical crack will be thereafter formed to the work 11 to be continuous to the recess.

As mentioned hereinbefore, according to the first embodiment of the present invention, the guide member 28 commonly acts as a member for guiding the vibration of the shaft 15 due to the vibration from the vibration generator 14 and a member for guiding the rising motion of the shaft 15 by means of magnets 17a and 17b. Thus, there is no cause of moment load such as caused in a conventional scribing device in which these guide members are independently separately disposed, whereby the horizontal vibration of the cutter 12 can be prevented from causing, and the cutter 12 can be hence vibrated only in the vertical direction.

In addition, when the table 18 is moved in the horizontal direction by the moving mechanism 19 while vibrating the cutter 12, the scribe (scribed) line 13 constituted by the vertical cracks is formed on the surface of the work 11, and the work 11 on which the scribe line 13 was formed is removed from the base 30 and then broken by using a breaking device, not shown, along the scribed line.

Figure 6:
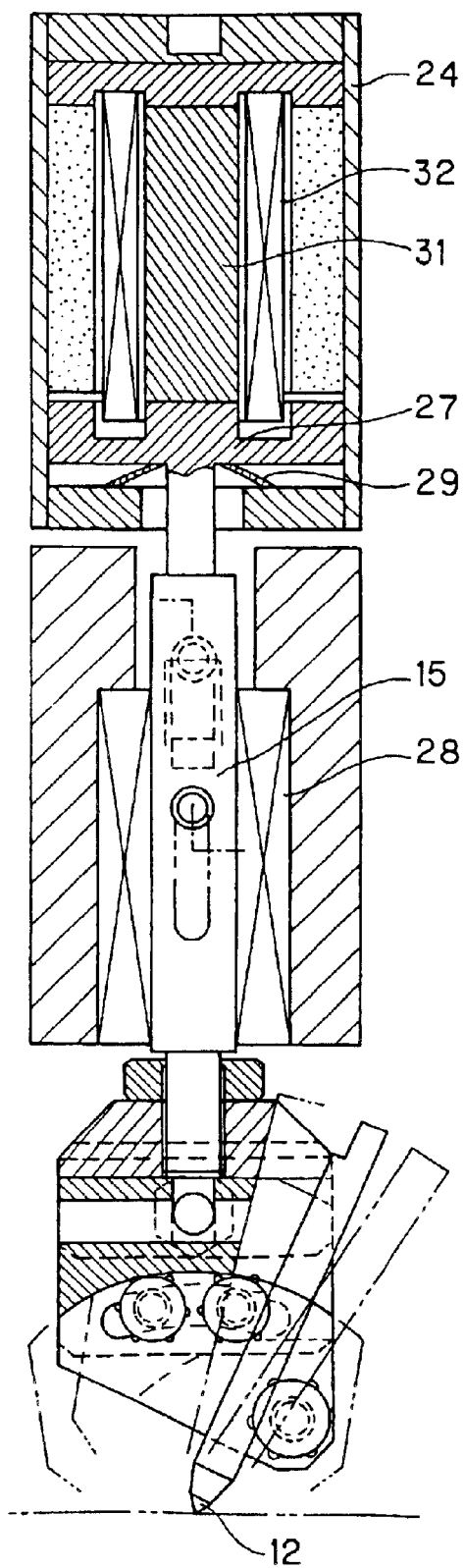
FIG. 6 is a vertical sectional view showing a scribing device according to a second embodiment of the present invention.
Figure 7:
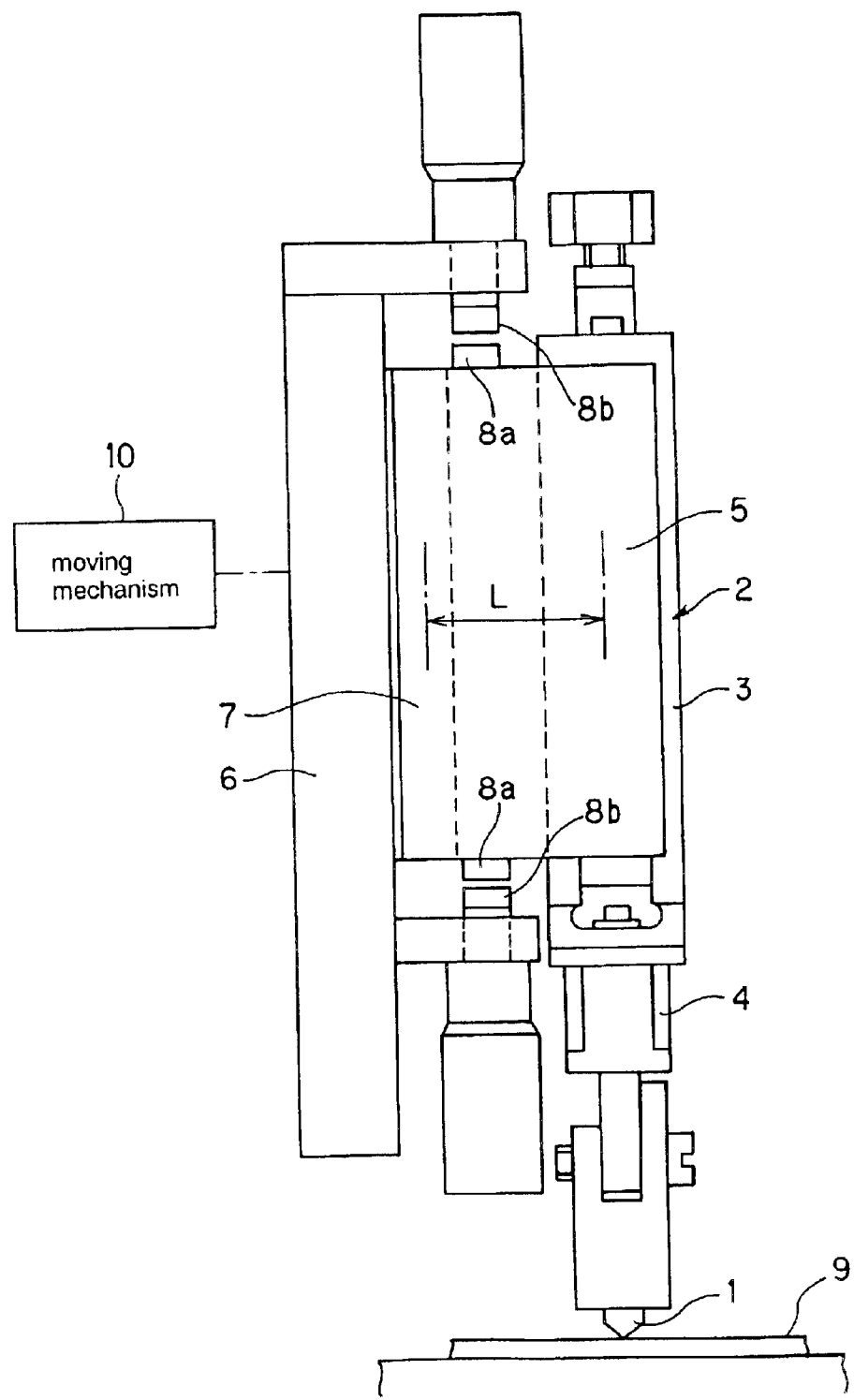
FIG. 7 is an illustration showing a front view of a scribing device having a conventional structure.

FIG. 6 represents a scribing device according to the second embodiment of the present invention. The scribing device of this second embodiment also comprises the vibration generator 14 generating vibration, the shaft 15 extending vertically from the vibration generator 14, the cutter 12 attached to the lower end portion of the shaft 15 so as to be vibrated by the vibration generator 14 through the shaft 15, the guide member 28 for guiding the linear motion of the shaft in its central axis direction and a pair of magnets, not shown, as a load adjusting means utilizing magnetic force for adjusting the load applied to the work 11 from the cutter 12. The guide member 28 is mounted to the table, not shown, which is movable by the moving mechanism 19.

In this second embodiment, the vibration generator 14 is formed by using a magnetic material which causes distortion to a magnetic body by applying a magnetic field, and more specifically, a super-magnetostrictive element 31 having larger displacement will be utilized.

A coil 32 is wound up around the super-magnetostrictive element 31 to thereby cause a magnetic field, and this magnetostrictive element 31 is also accommodated in the housing 24. The lower end of this super-magnetostrictive element 31 abuts against the holder 27 disposed to the upper end portion of the shaft 15, and on the other hand, the upper end of the super-magnetostrictive element 31 abuts against the upper portion of the housing 24. A spring 29 is disposed to the lower portion of the housing 24 so as to follow up the vibration of the super-magnetostrictive element 31 with that of the shaft 15. This spring has a coned disc shape having a constant sectional shape in its peripheral direction. The spring 29 urges upward the holder 27 by its elastic restitutive force and imparts a preload (force compressing the super-magnetostrictive element 31 in the axial direction) between the holder 27 and the upper portion of the housing 24.

When the magnetic field to be applied to the super-magnetostrictive element 31 varies at a predetermined frequency, the super-magnetostrictive element 31 is periodically expanded or contracted. That is, a stress is caused to the super-magnetostrictive element 31 by applying an external magnetic field and this stress is then transferred to the cutter 12. In general, since the super-magnetostrictive element has a generated stress larger than that of the piezoelectric element, the super-magnetostrictive element will be effectively utilized for cutting a material such as glass at a time desired to transmit a large stress to the cutter 12.

According to this second embodiment, the advantageous functions and effects such as mentioned above with reference to the first embodiment will be achieved.

Further, it is to be noted that the present invention is not limited to the described embodiment and many other changes and modifications may be made without departing from the scopes of the appended claims.

The present application claims priority under 35 U.S.C §119 to Japanese Patent Application No. 2001-338137 filed Nov. 2, 2001 entitled "SCRIBING DEVICE". The contents of that application are incorporated herein by reference in their entirety.

What is claimed is:

1. A scribing device for forming a scribe line on a work comprising:
   a vibration generator for generating vibration;
   a cutter for cutting a work by utilizing vibration of the vibration generator;
   a shaft extending vertically downward from the vibration generator so as to transmit the vibration of the vibration generator to the cutter;
   a guide unit for guiding a linear motion of the shaft to the cutter in a central axis direction thereof; and
   a load adjusting mechanism for adjusting a load to be applied to the work from the cutter, said load adjusting mechanism being operated by means of magnetic force,
   wherein said guide unit guides a moving motion of the shaft by said load adjusting mechanism and guides the vibration of the shaft caused by the vibration generated by the vibration generator.

2. The scribing device according to claim 1, further comprising a cutter moving mechanism for moving the cutter along the work.

3. The scribing device according to claim 1 or claim 2, wherein said shaft is formed, on an outer peripheral surface thereof, with a rolling member rolling portion, said guide unit comprises an outer sleeve fitted to said shaft, said sleeve being formed, on an inner peripheral surface thereof, with a rolling member rolling portion, and a number of rolling members interposed between the rolling member rolling portion formed on the shaft and the rolling member rolling portion formed 4. The scribing device according to claim 3, wherein said rolling members are balls and said rolling member rolling portion formed on the shaft and said rolling member rolling portion formed on the outer sleeve are grooves.

5. The scribing device according to claim 1 or 2, wherein said vibration generator has a center line and said shaft has a center line which is substantially aligned with the center line of the vibration generator.

6. The scribing device according to claim 1 or 2, wherein said vibration generator is accommodated in a housing and a coned disc spring is disposed in said housing at a portion between the shaft and the vibration generator so as to follow up the vibration of the shaft with that of the vibration generator.

7. The scribing device according to claim 2, further comprising a table movable with respect to the work, said guide unit is mounted to the table which is moved by said moving mechanism.

8. The scribing device according to claim 1, wherein said load adjusting mechanism comprises a pair of magnets disposed apart from each other in the shaft vibrating direction.

9. The scribing device according to claim 1 or 2, wherein said vibration generator comprises a piezoelectric element.

10. The scribing device according to claim 1 or 2, wherein said vibration generator comprises a super-magnetostrictive element.

11. The scribing device according to claim 1, wherein said shaft has a shaft center line, and said guide unit has a guide unit center line, wherein said shaft center line and said guide unit center line are substantially aligned with each other to effectively transfer the vibration of the shaft in the axial direction thereof minimizing the moment load applied to said shaft.

12. A scribing device for forming a scribe line on a work comprising:

a table disposed to be movable with respect to the work;

a moving mechanism for moving the table;

a vibration generator for generating vibration;

a cutter for cutting the work by utilizing vibration of the vibration generator;

a shaft extending vertically downward from the vibration generator so as to transmit the vibration of the vibration generator to the cutter;

a guide unit, mounted to the table, for guiding a linear motion of the shaft in a central axis direction thereof; and a load adjusting mechanism for adjusting a load to be applied to the work from the cutter, said load adjusting mechanism comprising a magnet.

13. The scribing device according to claim 12, wherein said magnet includes a pair of magnet pieces disposed apart from each other in the shaft vibrating direction.

14. The scribing device according to claim 12, wherein said shaft has a shaft center line, and said guide unit has a guide unit center line, wherein said shaft center line and said guide unit center line are substantially aligned with each other to effectively transfer the vibration of the shaft in the axial direction thereof thereby minimizing the moment load applied to said shaft.

15. A scribing device for forming a scribe line on a work comprising:

a vibration generator for generating vibration;

a cutter for cutting a work by utilizing vibration of the vibration generator;

a shaft extending vertically downward from the vibration generator so as to transmit the vibration of the vibration generator to the cutter; and a guide unit for guiding a linear motion of the shaft to the cutter in a central axis direction thereof;

wherein said guide unit guides the vibration of the shaft caused by the vibration generated by the vibration generator, and wherein said shaft is formed, on an outer peripheral surface thereof, with a rolling member rolling portion, said guide unit comprises an outer sleeve fitted to said shaft, said sleeve being formed, on an inner peripheral surface thereof, with a rolling member rolling portion, and a number of rolling members interposed between the rolling member rolling portion formed on the shaft and the rolling member rolling portion formed on the outer sleeve.

16. The scribing device according to claim 15, wherein said shaft has a shaft center line, and said guide unit has a guide unit center line, wherein said shaft center line and said guide unit center line are substantially aligned with each other to effectively transfer the vibration of the shaft in the axial direction thereof thereby minimizing the moment load applied to said shaft.

* * * * *